H. W. JORDAN.
TIRE PATCH.
APPLICATION FILED JUNE 28, 1920.

1,403,691. Patented Jan. 17, 1922.

Witness

Inventor,
H. W. Jordan.
By C. A. Snow & Co.
Attorneys

UNITED STATES PATENT OFFICE.

HOWARD W. JORDAN, OF KANSAS CITY, MISSOURI, ASSIGNOR TO A. J. STEPHENS RUBBER CO., INC., OF KANSAS CITY, MISSOURI.

TIRE PATCH.

1,403,691. Specification of Letters Patent. Patented Jan. 17, 1922.

Application filed June 28, 1920. Serial No. 392,238.

*To all whom it may concern:*

Be it known that I, HOWARD W. JORDAN, a citizen of the United States, residing at Kansas City, in the county of Jackson and State of Missouri, have invented a new and useful Tire Patch, of which the following is a specification.

This invention relates to a patch for pneumatic tire casings, one of its objects being to provide a device of this character having a reenforcement of wire whereby it will withstand the maximum pressure and rough usage.

A further object is to provide a structure of this character which is easy to manufacture, can be applied readily, and will not injure any of the parts against which it is placed.

With the foregoing and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings—

Figure 1:
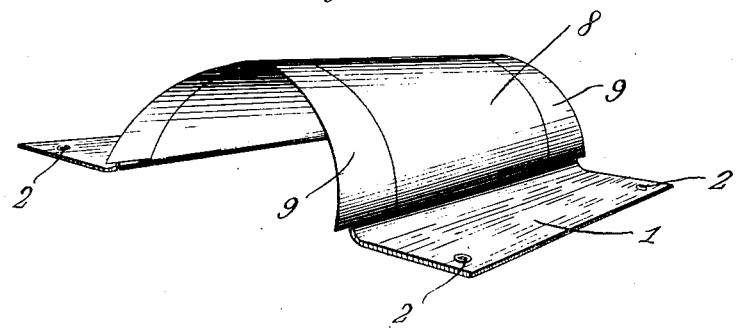
Figure 1 is a perspective view of the patch.

Referring to the figures by characters of reference 1 designates an inner layer of rubberized fabric provided, in opposed edge portions, with a desired number of eyelets 2 for the reception of a lace or the like whereby the patch can be held in place on a tire. Arranged in this thickness of rubberized fabric is a central reenforcing thickness of rubberized fabric indicated at 3 and over this second thickness is spread a third and larger thickness of rubberized fabric indicated at 4. The thickness 4 bears against one side of a reenforcement consisting of a wire fabric embedded in rubber and which thickness has been indicated at 6. Another thickness of rubberized fabric is provided at 7 and an outer finishing thickness of rubberized fabric is likewise provided, as indicated at 8. It will be noted by referring particularly to Figure 1 that the inner thickness 1 is larger than the other thicknesses and that the next largest thickness is the outer one indicated at 8. The other thicknesses 7, 4 and 3 are of reduced size, the thicknesses 4 and 7 constituting a housing for the layer consisting of rubber and wire fabric.

Figure 2:
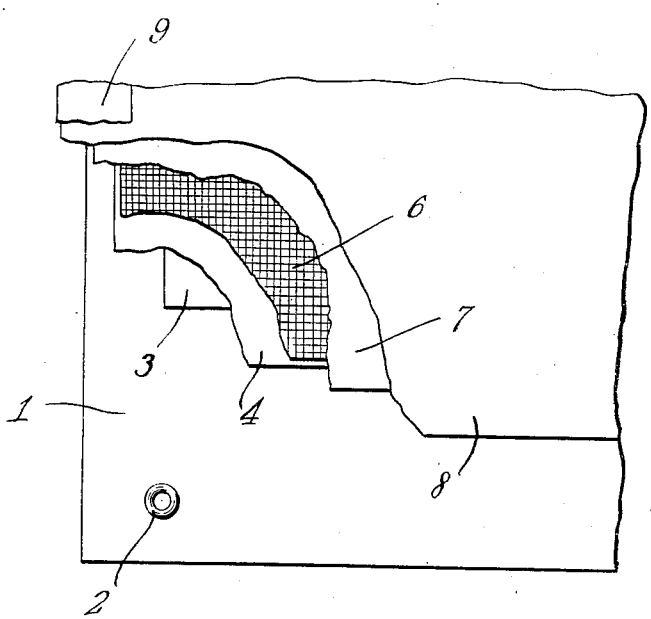
Figure 2 is a plan view of a portion thereof, parts being broken away.
Figure 3:
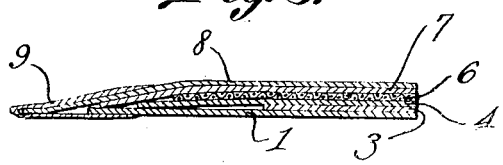
Figure 3 is a section through one end portion of the patch.

After the various thicknesses have been properly assembled, as shown in Figure 2, a protecting strip of sheet rubber 9 is folded over the front and back edges of the thicknesses 1 and 8 and the entire structure is then vulcanized so that the layers will adhere and become one compact body. During the vulcanizing process that portion of the patch made up of the different thicknesses is shaped as shown in Figure 1 leaving the opposed edge portions of the thickness 1 extending laterally to form aprons.

By providing the thickness of wire fabric and rubber between the rubberized fabrics 4 and 7, it is not possible for the ends of the wire to injure any of the surfaces against which the patch may be placed. These various thicknesses afford full protection and as the patch is reenforced with the wire fabric the entire device is free to resist pressure and wear to the maximum.

What is claimed is:

A tire patch comprising an inner layer of rubberized fabric having fastener receiving openings in opposed edge portions thereof, a central reenforcing thickness of rubberized fabric vulcanized throughout its area to the inner layer, said central reenforcing thickness having its edges spaced inwardly from the edges of the inner layer, a third thickness of rubberized fabric spread over and vulcanized to the central thickness and having its edge portions extending between the edge portions of the central thickness and of the inner layer and vulcanized to the inner layer, a wire fabric reenforcement embedded in rubber and vulcanized upon the said second thickness with its edges terminating inwardly, from the edges of said second thickness, another layer of rubberized fabric vulcanized on the rubber containing the wire fabric and extending beyond the edges of the central reenforcing thickness and the second thickness and vulcanized onto the inner layer, an outer finishing thickness of rubberized fabric extending over the central reenforcing thickness and the other thicknesses superposed thereupon, the side edges of this finishing thickness being vulcanized onto the inner layer inwardly from the side edges thereof, the end edges of the finishing thickness being extended beyond the end edges of the inner layer, and a protecting strip of sheet rubber folded over the projecting edges of the finishing thickness and the adjacent edges of the inner layer and vulcanized thereto, those portions of the inner layer projecting beyond the side edges of the finishing thickness constituting aprons, the protecting end strip terminating at the inner edges of the apron, that portion of the parts made up of the superposed thicknesses being transversely arched.

In testimony that I claim the foregoing as my own, I have hereto affixed my signature in the presence of a witness.

HOWARD W. JORDAN.

Witness:
FRANK CARTER.